United States Patent [19]

Manfanovsky

[11] 4,064,511
[45] Dec. 20, 1977

[54] CLUTTER SUBTRACTION SYSTEM

[75] Inventor: Serge Manfanovsky, Wayland, Mass.

[73] Assignee: Raytheon Company, Lexington, Mass.

[21] Appl. No.: 726,345

[22] Filed: Sept. 24, 1976

[51] Int. Cl.² .............................................. G01S 7/02
[52] U.S. Cl. .................................................. 343/7 A
[58] Field of Search ............... 343/7 A, 17.2 PC, 17.7

[56] References Cited

U.S. PATENT DOCUMENTS 3,953,849 4/1976 Couvillon ........................... 343/7 A

FOREIGN PATENT DOCUMENTS 2,531,102 1/1976 Germany ............................. 343/7 A Primary Examiner—T.H. Tubbesing
Attorney, Agent, or Firm—David M. Warren; Milton D. Bartlett; Joseph D. Pannone

[57] ABSTRACT

A radar system having transmitted and received signals, the system including a feedback loop for modulating a sample of the transmitted signal to duplicate the phase and amplitude of the clutter echoes from nearby points of reflection. The modulated transmitted sample is subtracted from the received signal to remove the clutter. The feedback loop detects differences between the clutter-free signal and the transmitted sample to produce an error signal, the error signal being filtered and applied to the modulator for modulating the phase and amplitude of the transmitted sample.

4 Claims, 5 Drawing Figures

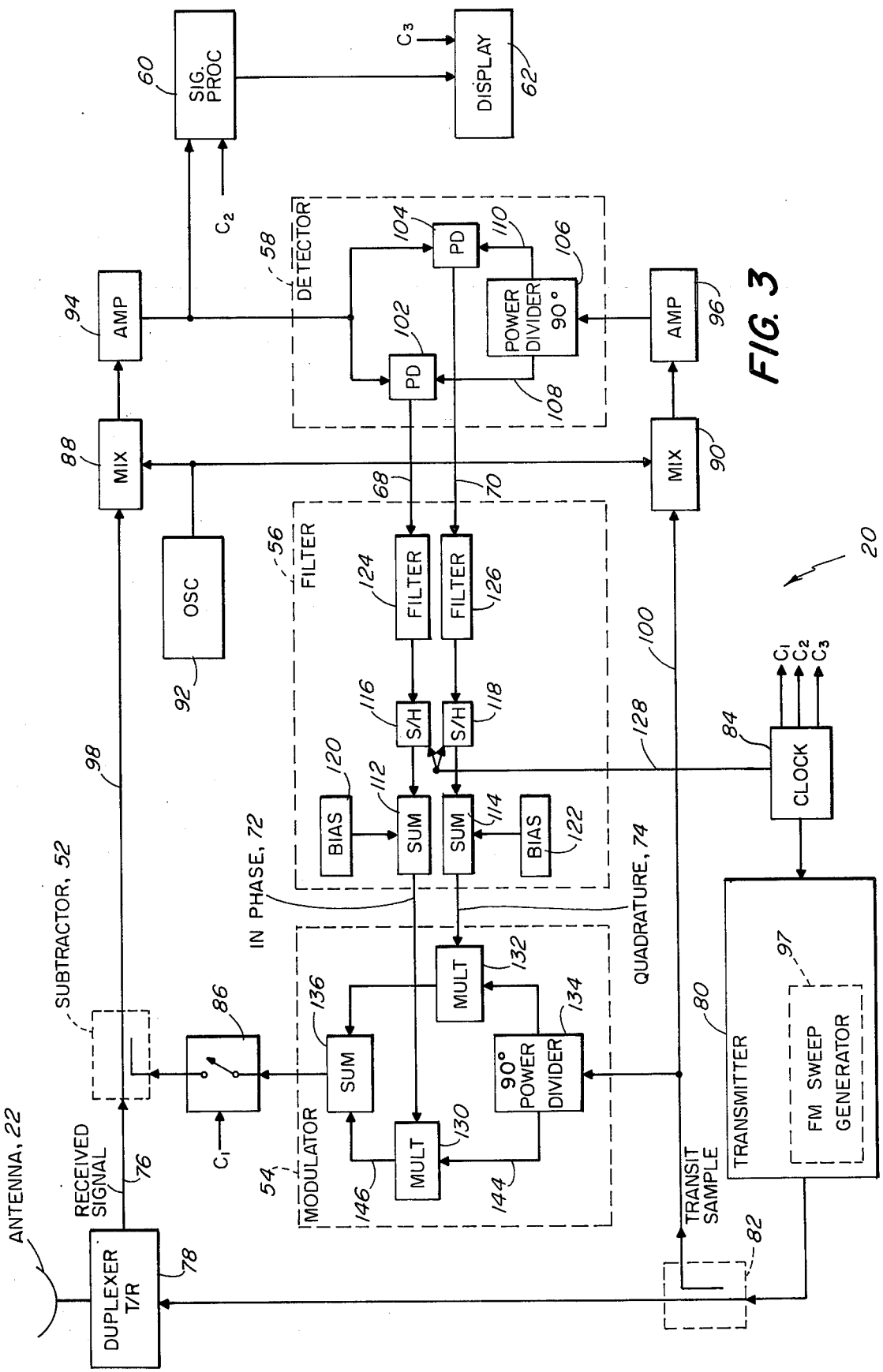

CLUTTER SUBTRACTION SYSTEM

BACKGROUND OF THE INVENTION

This invention relates to echo ranging systems such as radar and sonar systems and, more particularly, to an echo ranging system in which clutter returns from nearby objects are removed from echoes from distant objects.

Echo ranging systems frequently utilize transmitted pulses of radiant energy in which the duration of the pulse is equal to a substantial portion of the overall round trip time of propagation of radiant energy signals from the echo ranging system to a distant object and back to the echo ranging system. The use of a long duration pulse of radio frequency energy permits the transmission of a large amount of radiant energy as compared to that which can be transmitted in a relatively short pulse from transmitting equipment which is limited in its maximum peak power capability. To produce enhanced discrimination in range between closely spaced reflecting objects, the spectrum of the transmitted pulse of radiant energy is broadened by a modulation of the carrier, such modulation being typically a phase modulation of the carrier, one such form of phase modulation employing a quadratic phase shift pattern which results in a frequency modulation pattern in the form of a linear sweep. Such a modulation pattern is conveniently employed with pulse compression filters in radar and sonar receiving equipment for the discernment of closely spaced points of reflection.

A problem arises in that echo ranging systems are frequently employed in situations wherein nearby objects of reflection and distant objects of reflection, often referred to as targets, are simultaneously present. While the leading edges of echoes from nearby targets arrive at the radar or sonar system prior to the leading edges of echoes from distant targets, the relatively long duration of the transmitted pulses may result in extensive overlap of the major portion of the echoes of nearby targets with the echoes from distant targets. When the aforementioned linear sweep frequency modulation is employed, the instantaneous frequency of a portion of an echo from a nearby target differs from the instantaneous frequency of an overlapping portion of an echo from a distant target. Furthermore, the amplitude of an echo from a nearby target, such as the echo from a wave in a sea clutter situation, is much larger than the amplitude of the echo received from a distant target. In view of these differences in frequency, or phase, and amplitude of the echoes, the clutter of echoes from the nearby targets masks the echoes from the distant targets. Difficulties are encountered in echo receiving equipment in that automatic gain control used therein must have a large dynamic range to accommodate the large and the small amplitude echo signals. Such automatic gain control equipment, when tracking the large amplitudes of the clutter, tends to distort the waveforms of the echoes received from the distant targets with a resulting loss in data obtainable from such distant targets. The foregoing situation relates to both electromagnetic and sonic echo ranging systems and, since the invention to be described hereinafter applies to both electromagnetic and sonic echo ranging systems, the ensuing description will be given in terms of a radar system, it being understood that the description relates equally well to a sonar system.

SUMMARY OF THE INVENTION

The aforementioned problems of the prior art are overcome and other advantages are provided by a radar system having transmitted and received signals, and which, in accordance with the invention, modulates a sample of the transmitted signal to substantially duplicate received clutter signals, the modulated sample being subtracted from the received signal to provide a received signal free of clutter. In a preferred embodiment of the invention, the transmitted signal is phase modulated quadratically with time, this being a linear frequency sweep over the duration of the transmitted signal pulse. Such modulation provides a transmitted signal having an increased bandwidth suitable for the pulse compression of received signal echoes. In accordance with the invention, the aforementioned subtraction of the transmitted signal sample is accomplished by a feedback loop in which the clutter-free signal is compared to the transmitted sample by a detection of in-phase and quadrature components of the clutter-free signal to develop an error signal of the feedback loop. The error signal is then filtered and applied to a modulator which modulates the phase and amplitude of the transmitted sample to match the phase and amplitude of the clutter. Thereby, the clutter component of the received signal may be subtracted from the received signal. The bandwidth of the feedback loop provides a sufficient speed of response for tracking clutter of nearby reflecting objects for which the frequency and phase of the echo approximates that of the transmitted signal phase. The loop bandwidth is sufficiently narrow to preclude the tracking of echoes from distant reflecting objects for which the frequency of the echoes differs substantially from that of the transmitted signal pulse. Thereby, distant objects, or targets can be observed since the echoes therefrom are essentially unaffected by the feedback loop.

BRIEF DESCRIPTION OF THE DRAWINGS

The aforementioned aspects and other features of the invention are explained in the following description taken in connection with the accompanying drawings wherein:

FIG. 3 is a detailed block diagram of the radar system and the feedback loop of FIG. 1;

DESCRIPTION OF THE PREFERRED EMBODIMENT

Figure 1:
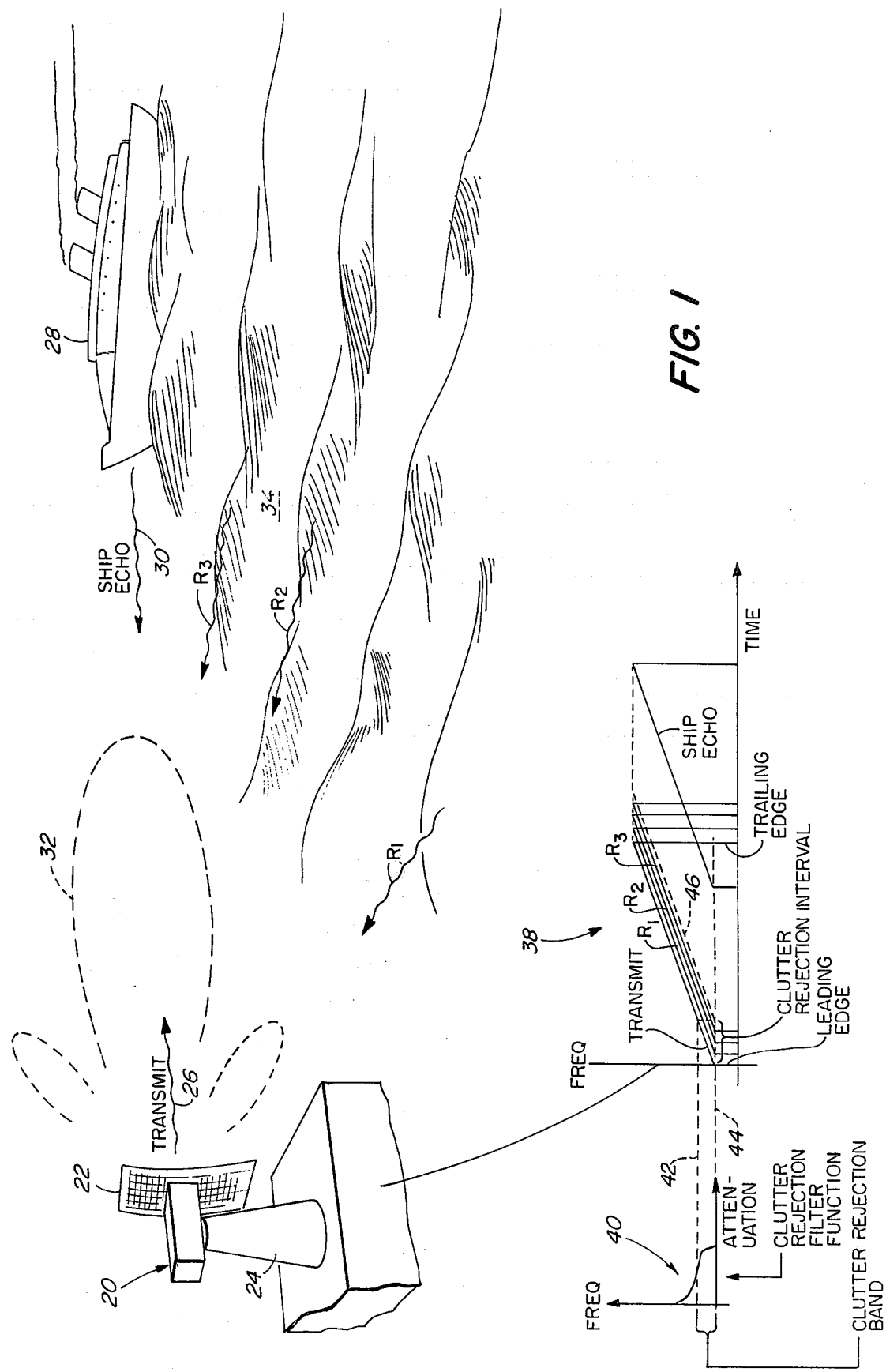
FIG. 1 is a stylized pictorial view of a radar system transmitting signals to a ship on the ocean, the radar system receiving clutter from waves of the ocean and an echo from the ship the figure also showing a diagram of the temporal relationship of the various received signals.

Referring now to FIG. 1, a radar system 20 includes an antenna 22 pivotally mounted on a base 24 for directing radiant energy, indicated by a wavy arrow 26, towards a ship 28. A portion of the transmitted radiant energy reflects from the ship 28 as an echo, indicated by a wavy arrow 30 and propagates back towards the antenna 22. A radiation pattern 32, shown by a dashed line, includes a main lobe and side lobes, the main lobe being directed towards the ship 28 for receiving the echo on the arrow 30, while the main lobe and a side lobe are shown receiving echoes in the form of clutter, identified by the wavy arrows labeled R1, R2 and R3, from waves of the ocean 34.

The base 24 houses circuitry, to be described hereinafter with reference to FIGS. 2 and 3 which generates a signal waveform for transmission from the antenna 22, the signal waveform being described by a graph 38, the signal transmitted from the antenna 22 being a pulse of a radio frequency carrier wherein the frequency of the carrier is modulated, or swept, linearly with time to produce what is often referred to as an FM sweep. The graph 38 shows a ramp waveform labeled "transmit" beginning with one value of frequency, that value of frequency linearly increasing with time until a maximum value of frequency is obtained, at which point the pulse of transmitted electromagnetic energy is terminated. The clutter echoes from the waves of the ocean are also depicted in the graph 38, traces representing the clutter being identified by the legends R1, R2 and R3 corresponding to the labeling of the arrows depicting the clutter radiating from the waves of the ocean 34. The traces R1, R2 and R3 are shown displaced from the origin of the graph 38 by increasing distances along the time axis, these distances representing the round trip time for propagation from the antenna 22 to respective ones of the waves and back to the antenna 22. A trace identified "ship echo" in the graph 38 describes the echo received via the arrow 30. Each of the traces of the graph 38 are drawn with the same ramp waveform to demonstrate that the relationship of frequency of the electromagnetic carrier versus time is the same for the transmitted signal as for each of the echoes. The graph 38 shows that the echoes of the arrows R1, R2 and R3 occur during a relatively short interval following the transmission of a radar signal from the antenna 22, while the ship echo is seen to arrive after a longer interval of time has elapsed. It is also noted that the duration of the transmitted signal pulse, as compared to the round trip echo time, results in an overlapping of the clutter echoes with the ship echo.

Figure 2:
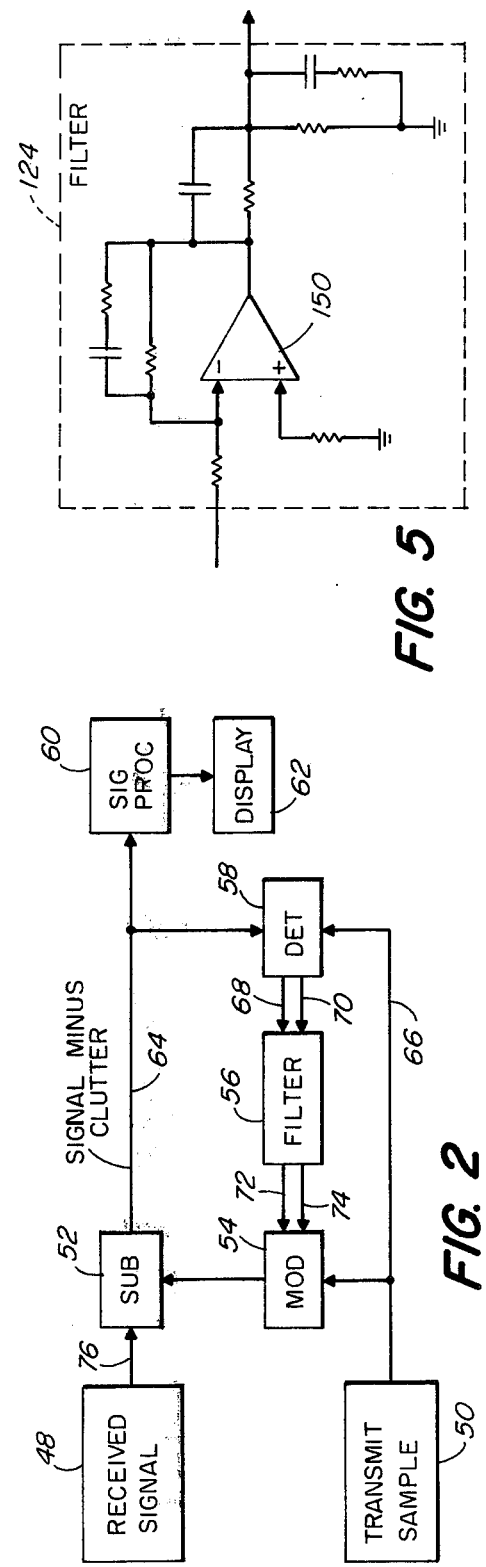
FIG. 2 is a block diagram of a portion of the radar system of FIG. 1 and shows a simplified representation of the feedback loop of the invention.

Also shown in FIG. 1 is a graph 40 appended to the graph 38 by dotted lines 42 and 44, the line 44 representing the lowest value of transmitted frequency while the line 42 represents the highest value of transmitted frequency which a feedback loop, to be disclosed hereinafter with reference to FIGS. 2 and 3, is able to track. The graph 40 represents the response of that feedback loop and is seen to be an attenuation of received signals over a frequency band, the clutter rejection band, wherein the difference of frequency between the transmitted signal and a received signal is less than the frequency difference represented by the spacing of the lines 42 and 44. The edge of the clutter rejection band is further shown by the dotted line 46 which teaches that echoes beginning in the clutter rejection interval are attenuated. Thus, echoes arriving sufficiently soon after the transmission of the radar signal such that a trace describing such signal would fall within the region on the graph 38 between the line 46 and the line representing the transmitted signal would be attenuated by the feedback loop. A signal such as that represented by the ship echo trace, which is seen to be to the right of the line 46 has an instantaneous difference in frequency, as compared to the transmitted signal, such that the difference frequency lies outside the bandwidth of the feedback loop and is, accordingly, unaffected by the feedback loop. Thus, a signal such as the ship echo is received by the radar system 20 without being perturbed by the feedback loop.

Referring now to FIG. 2, a simplified diagram of a portion of the system 20 of FIG. 1 shows two blocks 48 and 50 representing, respectively, an echo signal received by the system 20 of FIG. 1 and a sample of a signal transmitted by the system 20. Also shown in FIG. 2 is a subtractor 52, a modulator 54, a filter 56, a detector 58, a signal processor 60 and a display 62. The subtractor 52, the modulator 54, the filter 56 and the detector 58 comprises the aforementioned feedback loop which, in accordance with the invention, modulates a sample of the transmitted signal and subtracts that modulated sample from the received signal to produce, on line 64, a received signal minus the clutter component thereof. With reference to the graph 38 of FIG. 1, the total signal received during the first portion of the ship echo includes the clutter represented by the arrows R1, R2 and R3. Removal of this clutter by the subtractor 52 of FIG. 2 leaves on line 64 only the signal associated with the ship echo. Thus, it is seen that the signal on line 64 comprises all echoes except those wherein the instantaneous frequency difference between the transmitted signal and the echo lie within the rejection band portrayed in the graph 38.

In operation, a detector 58 detects inphase and quadrature components of the signal on line 64 relative to the transmitted sample of line 66, the differences between the inphase and quadrature components appearing as error signals on lines 68 and 70. The error signals are filtered by the filter 56 and applied, respectively, via lines 72 and 74 to the modulator 54 for altering the magnitudes and phase of the transmitted sample to match that of the clutter. Thereupon, the modulated sample is applied by the modulator 54 to the subtractor 52 for subtraction from the received signal, the subtraction process resulting in the cancellation of the clutter from the received signal on line 76. The received signal free of clutter, on line 64 is applied to the signal processor 60, which may include a pulse compression filter, storage media and a range tracker (not shown) as are frequently employed in radar systems. The output of the processor 60 is applied to the display 62 for displaying data provided by the received signal.

Referring now to FIG. 3, there is seen a block diagram of the system 20 of FIG. 1 showing the details of the feedback loop of FIG. 2 and other components of the system 20. FIG. 3 shows the antenna 22 of FIG. 1 and the subtractor 52, the modulator 54, the filter 56, the detector 58, the processor 60 and the display 62 of FIG. 2. Also seen are the lines 68 and 70 coupling the error signals from the detector 58 to the filter 56 and the lines 72 and 74 coupling the filtered error signals from the filter 56 to the modulator 54. The subtractor 52 comprises a microwave-coupler such as 20 db (decibels) coupler in which 1/100 of the power from the modulator 54 is combined with the received signal from the antenna 22. The system 20 also comprises a duplexer 78 which includes a transmit-receive circuit (not shown), a transmitter 80, a microwave coupler 82, a clock 84, a switch 86, two mixers 88 and 90, an oscillator 92, and two amplifiers 94 and 96.

The duplexer 78 couples the signal from the transmitter 80 to the antenna 22 for radiation therefrom and couples received echo signals from the antenna 22 to the subtractor 52. The transmit-receive circuit of the duplexer 78 decouples the subtractor 52 during the transmission of a signal pulse by the transmitter 80 to prevent a large surge of transmitted power from entering the subtractor 52. The coupler 82, which may be an 80 db coupler by way of example, permits a small fraction of the transmitted signal power to be coupled to the modulator 54 and the mixer 90 to serve as the transmit sample. The transmitter 80 includes a waveform generator 97 for providing the aforementioned FM sweep to the transmitted signal. The clock 84 provides timing signals for synchronizing the operation of the transmitter 80 and the generator 97 to the switch 86, the filter 56, the processor 60 and the display 62. The timing signals to the switch 86, the processor 60 and the display 62 are shown via the terminals, respectively, C1, C2 and C3.

The modulator 54 operates at microwave frequencies while the input signals to the detector 58 are at intermediate frequencies (IF). Accordingly, the mixers 88 and 90 mix a signal from the oscillator 92 with, respectively, the clutter-free signal from the subtractor 52 on line 98 and the transmit sample on line 100 to translate the signals to an intermediate frequency. The output signals of the mixers 88 and 90 are coupled respectively via the amplifiers 94 and 96 to the detector 58.

The switch 86 is an optional component which is operated by the clock to disconnect the modulator 54 from the subtractor 52 after the termination of the clutter rejection interval shown in graph 38 of FIG. 1. Operation of the switch 86 insures that there is no interference of the modulator 54 with the reception of echoes from the ship 28 of FIG. 1. However, even with a direct connection of the modulator 54 to the subtractor 52 in the absence of the switch 86, there is substantially no interference by the modulator 54 with the echoes received from the ship 28 for the reasons hereinabove, namely, that the frequency difference between the transmitted signal and the received signal is sufficiently great so as to be outside the bandwidth of the feedback loop.

The detector 58 comprises two phase detectors 102 and 104, and a 90° power divider 106 which couples the transmit sample to the phase detectors 102 and 104 via lines 108 and 110 and introduces a 90° phase shift between the signals on lines 108 and 110. Thus, the transmit sample, via the power divider 106, provides inphase and quadrature reference signals for the phase detectors 102 and 104. The output signals of the phase detectors 102 and 104 on the lines 68 and 70 are the inphase and quadrature components of the error signal, the error signal, as noted hereinabove, being the difference between the clutter-free signal on line 98 and the transmit sample on line 100.

The filter 56 comprises two summers 112 and 114, two sample and hold units hereinafter referred to as samplers 116 and 118, two sources 120 and 122 of bias voltage, and two filters 124 and 126. The filter 124 filters the inphase component of the error signal on line 68 and applies the filtered signal to the sampler 116. The sampler 116 is strobed by a clock pulse signal on line 128 from the clock 84 upon the occurrence of the trailing edge of the transmitted signal pulse, seen in the graph 38 of FIG. 1, and in response to the strobing, samples the output signal of the filter 124. The sampler 116 holds the signal until the beginning of the next strobing pulse at which time it drops the sample and acquires a new sample of the output signal of the filter 124. Thereby, the pulses of error signal appearing on line 68 are converted to a continuous value of error signal voltage which is applied to the summer 112. A bias voltage from the source 120 is summed by the summer 112 to the error signal voltage prior to the coupling of the error signal voltage via the line 72 to the modulator 54. The bias voltage of the source 120 serves to establish an operating point for diodes of a multiplier (to be described hereinafter) in the modulator 54. The foregoing description for the production of the inphase error signal voltage on line 72 applies also to the operation of the filter 126, the sampler 118, the summer 114 and the bias source 122 for producing the quadrature error signal voltage on line 74.

The modulator 54 comprises two multipliers 130 and 132, a 90° power divider 134, and a summer 136 comprising a power combiner, each of which operate at the microwave frequency of the transmitted signal. The power divider 134 operates in a manner analogous to the power divider 106 and provides inphase and quadrature components of the transmit sample to the multipliers 130 and 132. The multiplier 130 multiplies the inphase error signal by the inphase component of the transmit sample and applies the product to the summer 136. Similarly, the multiplier 132 multiplies the quadrature error signal by the quadrature component of the transmit sample and applies the product to the summer 136. The summer 136 sums the two products to produce the aforementioned modulated transmit sample which is coupled by the switch 86 to the subtractor 52.

Figure 4:
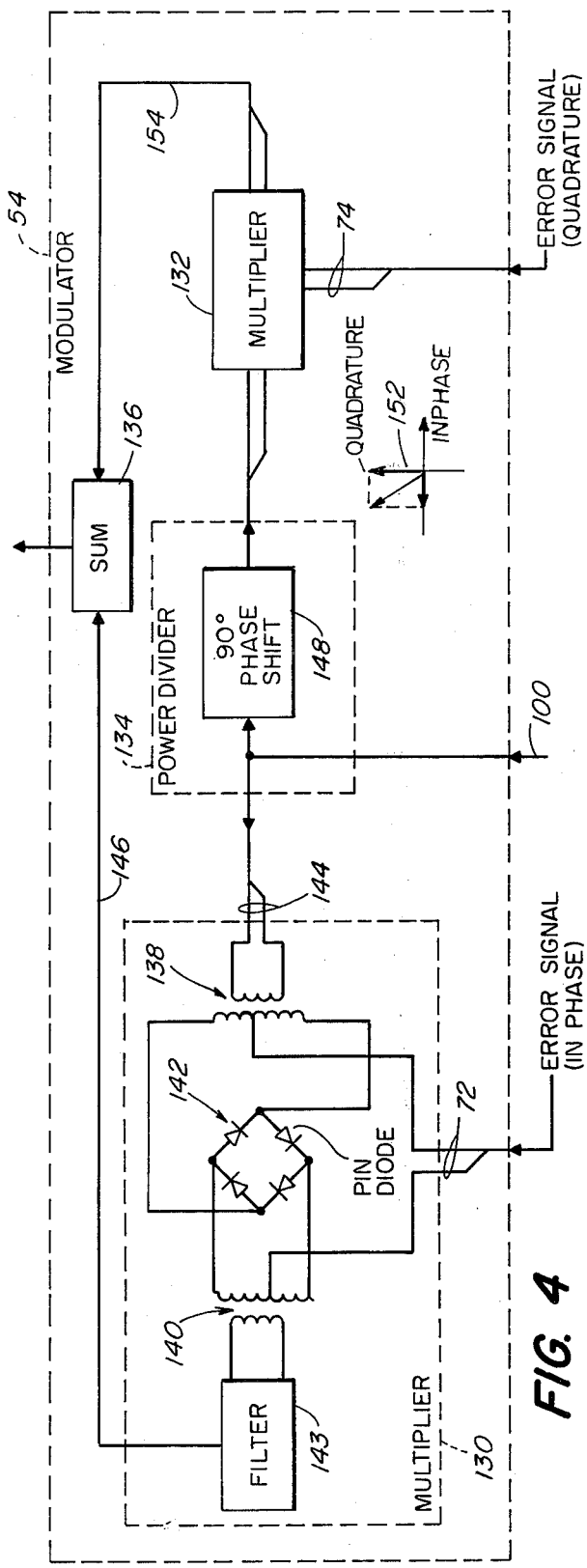
FIG. 4 is a schematic diagram of a multiplier of a modulator of FIG. 3 and its interconnections with the other components of the modulator.

Referring now to FIG. 4, the schematic diagram of the multiplier 130 and its interconnections with the other components of the modualtor 54 of FIG. 3 are shown, the multiplier 130 being identical to the multiplier 132. The multiplier 130 comprises an input transformer 138 and an output transformer 140 coupled via a diode bridge circuit 142, and an output band pass filter 143. Terminal pairs representing the lines 144 and 72, seen also in FIG. 3, apply respectively the transmit sample and the error signal voltage to the multiplier 130 while the product signal is coupled from the output transformer 140 via the filter 143 and a line 146 to the summer 136. The pass band of the filter 143 is sufficiently broad to pass the spectral components of the product signal while sufficiently narrow to attenuate the spectral components of the multiplying operation lying outside the frequency band of the product signal. The bias voltage from the source 120 of FIG. 3 establishes the operating point of the diodes of the diode bridge circuit 142. In particular, it is noted that the product on line 146 may be positive or negative, depending on the sign of the error signal voltage, and of varying amplitude depending on the magnitude of the error signal voltage. The multiplier 130 is commercially available and typically comprises PIN diodes for the diode bridge circuit 142 for use at microwave frequencies. The power divider 134, also seen in FIG. 4, is portrayed schematically as providing a direct connection between the lines 100 and 144 and having a 90° phase shifter 148 for coupling signals from line 100 to the multiplier 132. The power divider 134 is commercially available for microwave frequencies and typically comprises a hybrid circuit having two output terminals in which the 90° phase shift appears between signals at the two output terminals.

Figure 5:
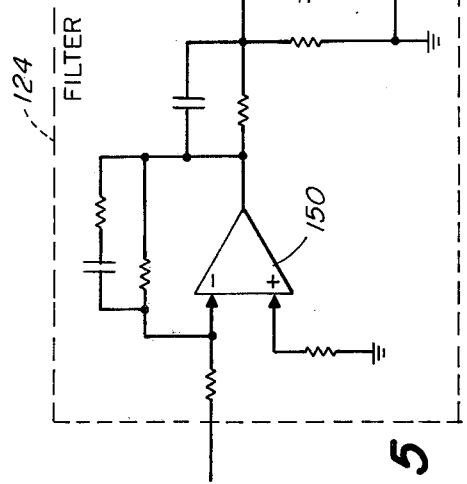
FIG. 5 is a schematic diagram of a filter shown in FIG. 3.

Referring now to FIG. 5, there is shown a schematic diagram of the filter 124 of FIG. 3. The filter 124 comprises an operational amplifier 150 having a feedback path composed of a resistor-capacitor circuit, and an output circuit coupled between the output terminal of the amplifier 150 and ground, the output circuit also comprising resistors and capacitors. The filter 124 is identical to the filter 126 of FIG. 3. The resistor-capacitor circuitry shown is exemplary only and may be altered to suit specific performance requirements for the feedback loop of FIGS. 2 and 3 to provide an attenuation characteristic, such as that shown by the graph 40 of FIG. 1, for the clutter rejection band, also shown in FIG. 1. All of the components of the feedback loop of FIGS. 2 and 3 are of relatively wide bandwidth and introduce substantially no phase shift as compared to the bandwidth and phase shift of the filter 124. Thus, the frequency, phase and amplitude shaping of the feedback loop pressure is controlled by the components of the filter 124, the phase and amplitude responses of the other components of the feedback loop being substantially invariant with frequency over the operating bandwidth of the feedback loop. The filter 124 is designed in accordance with standard feedback loop design procedures and provides that the forward gain of the filter 124 is less than unity when the phase shift of the open loop transfer function approaches 180° to insure stability of the feedback loop. Alteration of the values of the capacitors and/or the resistors in the feedback loop and in the output circuit of the filter 124 shift the break points in the open loop transfer function and thereby alter the shape of the closed loop attenuation characteristic portrayed in the graph 40 of FIG. 1 to provide the desired dynamic response to the feedback loop.

Returning to FIG. 4, a graph 152 portrays the inphase and quadrature components of the signals, respectively on lines 146 and 154, applied to the summer 136 by the multipliers 130 and 132. The inphase signal is portrayed by a vector on the horizontal axis of negative sense while the quadrature signal is portrayed as a vector on the vertical axis of positive sense and having an amplitude greater than that of the inphase vector. The resultant vector is seen to have a phase angle of approximately 120° and a magnitude greater than either of the signals on lines 146 and 154. The graph 152 shows that variations in the magnitude and sense of the error signals on the lines 72 and 74 produce variations in the inphase vector and in the quadrature vector so that the signal produced by the summer 136 can match both the amplitude and the phase of the signal on line 76 of FIGS. 2 and 3.

It is understood that the above-described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:
1. A system operative with a transmitted signal and a received signal, the system comprising:
 means for modulating a sample of said transmitted signal to match a component of said received signal;
 means coupled to said modulating means for combining said transmitted sample with said received signal; and
 means coupled to said combining means for detecting a difference between said transmitted sample and said component of said received signal, said detecting means being coupled to said modulating means to provide a modulated signal of said modulating means which reacts with said received signal in said combining means to cancel said component of said received signal.

2. A system according to claim 1 wherein said combining means is a subtraction circuit for producing the difference between said received signal and said modulated signal.

3. A system according to claim 2 wherein said detecting means comprises inphase and quadrature detectors of the phase difference between an output signal of said combining means and said transmitted signal sample and wherein said modulator comprises inphase and quadrature multipliers for multiplying said transmitted signal sample by output signals of said phase detectors of said detecting means.

4. In combination:
 means for generating a phase modulated signal;
 a modulator, a combiner, and a detector;
 power direction means coupled to said generating means for directing a portion of the power of said phase modulated signal via a reflector to said combiner, said power directing means directing a second portion of power of said phase modulated signal to an input terminal of said modulator, said combiner combining an output signal of said modulator with said signal coupled via said reflector from said power directing means, said detector detecting a difference between said signal at said input terminal of said modulator and an output terminal of said chamber, an output chamber of said detector being coupled to said modulator for modulating said signal at said input terminal thereof for providing a signal at an output terminal of said modulator which substantially matches a component of said signal coupled via said reflector to said combiner whereby said combiner combines said signal at said modulator output terminal which said signal coupled via said reflector to cancel said component of said signal coupled via said reflector.

* * * * *

UNITED STATES PATENT OFFICE
CERTIFICATE OF CORRECTION

Patent No. 4,064,511          Dated December 20, 1977

Inventor(s) Serge Manfanovsky

It is certified that error appears in the above-identified patent and that said Letters Patent are hereby corrected as shown below:

Column 2, line 32, delete "phase" insert -pulse-;

Column 5, line 37, insert "given" after -reasons-;

Column 7, line 16, delete "pressure" insert -response-;

Column 8, line 44, delete "chamber" first occurrence, insert -combiner-;

Column 8, line 44, delete "chamber" second occurrence, insert -terminal-.

Signed and Sealed this

Ninth Day of May 1978

[SEAL]

Attest:

RUTH C. MASON
Attesting Officer

LUTRELLE F. PARKER
Acting Commissioner of Patents and Trademarks